United States Patent
Kake

(10) Patent No.: US 9,310,962 B2
(45) Date of Patent: Apr. 12, 2016

(54) USER INTERFACE IN WHICH OBJECT IS ASSIGNED TO DATA FILE AND APPLICATION

(75) Inventor: Tomokazu Kake, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 1613 days.

(21) Appl. No.: 12/047,617

(22) Filed: Mar. 13, 2008

(65) Prior Publication Data

US 2008/0229224 A1    Sep. 18, 2008

(30) Foreign Application Priority Data

Mar. 16, 2007  (JP) ................. 2007-069489

(51) Int. Cl.
G06F 3/0481  (2013.01)
G06F 9/44    (2006.01)
G06F 3/0486  (2013.01)

(52) U.S. Cl.
CPC .......... G06F 3/04817 (2013.01); G06F 9/4443 (2013.01); G06F 3/0486 (2013.01)

(58) Field of Classification Search
CPC ... G06F 3/0486; G06F 3/048; G06F 3/04817; G06F 9/4443
USPC ................................. 715/700, 769
See application file for complete search history.

(56) References Cited

U.S. PATENT DOCUMENTS

| | | | | |
|---|---|---|---|---|
| 5,592,195 A * | 1/1997 | Misono | ........... | G06F 3/0485 345/419 |
| 5,742,286 A * | 4/1998 | Kung | ........... | G06F 3/0486 715/733 |
| 5,796,406 A * | 8/1998 | Shigematsu | ........... | G06F 3/0481 345/173 |
| 5,886,692 A * | 3/1999 | Brewer | ........... | G06F 3/0481 709/203 |
| 5,949,417 A * | 9/1999 | Calder | ........... | G06F 3/0481 715/788 |
| 6,025,828 A * | 2/2000 | Berry | ........... | G06F 3/0482 715/835 |
| 6,191,807 B1 * | 2/2001 | Hamada | ........... | H04N 7/15 348/14.03 |
| 6,784,901 B1 * | 8/2004 | Harvey | ........... | H04L 12/1827 709/204 |
| 6,968,511 B1 * | 11/2005 | Robertson | ........... | G06F 3/048 715/205 |
| 6,976,224 B2 * | 12/2005 | Nii | ........... | G06F 3/0486 715/769 |
| 7,302,649 B2 * | 11/2007 | Ohnishi | ........... | G06F 3/0486 715/769 |
| 7,587,681 B2 * | 9/2009 | Kake | ........... | G06F 17/30058 707/999.104 |
| 7,730,425 B2 * | 6/2010 | de los Reyes | ........... | G06F 9/4443 715/834 |

(Continued)

FOREIGN PATENT DOCUMENTS

| | | |
|---|---|---|
| JP | 2000-227828 | 8/2000 |
| JP | 2001-306213 | 11/2001 |
| JP | 2005-31732 | 2/2005 |

OTHER PUBLICATIONS

IBM, NN9504407, Apr. 1, 1995. pp. 2.*

(Continued)

*Primary Examiner* — Ece Hur

(74) *Attorney, Agent, or Firm* — Katten Muchin Rosenman LLP

(57) ABSTRACT

A data processing technology provides improved convenience. A user interface unit assigns a first object to a data file and displays the object on a screen. The unit also assigns a second object to an application processing the data file and displaying the object on the screen. When an operation to allow the first object to affect the second object is accepted, a notifying unit notifies the application of the direction or speed of the operation. The operation determining unit determines an operation performed in processing the data file, based an the direction or speed.

5 Claims, 19 Drawing Sheets

(56) References Cited

U.S. PATENT DOCUMENTS

| | | | | |
|---|---|---|---|---|
| 7,830,534 B2* | 11/2010 | Tomita | G06F 3/0486 | 358/1.13 |
| 7,996,789 B2* | 8/2011 | Louch | G06F 3/0486 | 715/744 |
| 8,135,617 B1* | 3/2012 | Agostino | G06Q 30/0241 | 705/1.1 |
| 8,259,136 B2* | 9/2012 | Kim | G06F 3/0488 | 345/660 |
| 8,806,364 B2* | 8/2014 | Hwang | G06F 3/0488 | 715/788 |
| 8,910,068 B2* | 12/2014 | Shin | | 715/765 |
| 2002/0044161 A1* | 4/2002 | Sugai | G06F 3/0481 | 715/781 |
| 2002/0059402 A1* | 5/2002 | Belanger | H04L 67/2823 | 709/220 |
| 2003/0222915 A1* | 12/2003 | Marion | G06F 3/0486 | 715/769 |
| 2004/0027383 A1* | 2/2004 | Jaeger | G06F 3/0481 | 715/769 |
| 2005/0223342 A1* | 10/2005 | Repka | G06F 3/0481 | 715/851 |
| 2006/0069603 A1* | 3/2006 | Williams | G06F 3/0482 | 715/834 |
| 2006/0082901 A1* | 4/2006 | Shoemaker | G06F 3/0481 | 359/692 |
| 2006/0161622 A1* | 7/2006 | Montgomery | G06F 3/1454 | 709/204 |
| 2007/0089063 A1* | 4/2007 | Breyer | G06F 8/34 | 715/763 |
| 2007/0150842 A1* | 6/2007 | Chaudhri | G06F 3/04883 | 715/863 |
| 2007/0216938 A1* | 9/2007 | Tomita | G06F 3/0486 | 358/1.15 |
| 2008/0074540 A1* | 3/2008 | Liu | H04N 5/76 | 348/474 |
| 2008/0252611 A1* | 10/2008 | Min | G06F 3/04883 | 345/173 |
| 2009/0228792 A1* | 9/2009 | van Os | G06F 3/0488 | 715/702 |
| 2010/0125806 A1* | 5/2010 | Igeta | G06F 3/0486 | 715/770 |
| 2010/0295805 A1* | 11/2010 | Shin | G06F 3/04883 | 345/173 |
| 2010/0299599 A1* | 11/2010 | Shin | G06F 3/0482 | 715/702 |
| 2011/0116769 A1* | 5/2011 | Sugiyama | G06F 3/0481 | 386/282 |
| 2011/0219323 A1* | 9/2011 | Woo | G06F 3/048 | 715/769 |
| 2011/0314363 A1* | 12/2011 | Isozu | G06F 17/30905 | 715/205 |
| 2012/0182296 A1* | 7/2012 | Han | G06F 3/04883 | 345/419 |
| 2014/0191986 A1* | 7/2014 | Kim | G06F 3/0488 | 345/173 |

OTHER PUBLICATIONS

Notification of Reason(s) for Refusal dated Sep. 27, 2011, from corresponding Japanese Application No. 2007-069489.

Decision of Refusal dated May 15, 2012, from corresponding Japanese Application No. 2007-069489.

* cited by examiner

FIG.2

| FILE ID | FILE NAME | PATH | FILE TYPE | FILE SIZE |
|---|---|---|---|---|
| 0001 | image.jpg | c:¥img¥ | jpeg IMAGE | 330kb |
| 0002 | pet.bmp | c:¥img¥ | bmp IMAGE | 945kb |
| ⋮ | ⋮ | ⋮ | ⋮ | ⋮ |

FIG.3

| APPLICATION ID | FILE TYPE | PROCESS-ABILITY | FILE TYPE | PROCESS-ABILITY | .. |
|---|---|---|---|---|---|
| 0001 | bmp IMAGE | 100 | jpeg IMAGE | 50 | .. |
| 0002 | mp3 AUDIO | 100 | wav AUDIO | 100 | .. |
| ⋮ | | ⋮ | | ⋮ | .. |

USER INTERFACE IN WHICH OBJECT IS ASSIGNED TO DATA FILE AND APPLICATION

BACKGROUND OF THE INVENTION

1. Field of the Invention

The present invention relates to data processing technologies and, more particularly, to a data processing program, data processor, and data processing method providing a user interface in which an object is assigned to a data file and an application and is displayed.

2. Description of the Related Art

Graphical user interface is widely used. In graphical user interface, an icon is assigned to a data file, application, and the like and is displayed on a screen. The interface accepts a direction for manipulating a data file, application, and the like via an operation of an icon.

We have developed a novel technology for improving convenience of graphical user interface, with which a majority of users are familiar, by adding useful functions.

SUMMARY OF THE INVENTION

A general purpose of the present invention is to provide a more convenient data processing technology.

One aspect of the present invention relates to a data processing program product. A data processing program product comprises: a module which assigns a first object to a data file, displays the first object on a screen, and accepts an operation of the data file in the form of an operation of the first object, and which assigns a second object to an application adapted to process the data file, displays the second object on the screen, and accepts an operation of the application in the form of an operation of the second object; and a module which, when an operation to allow the first object to affect the second object is accepted, notifies the application assigned the second object of the data file assigned the first object, and which notifies the application of the direction or speed in which the first object is operated to affect the second object, or the position at which the first object is allowed to affect the second object.

Optional combinations of the aforementioned constituting elements, and implementations of the invention in the form of methods, apparatuses, systems, and the like may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 shows an example of data in a file database;

FIG. 3 shows an example of data in an application database;

DETAILED DESCRIPTION OF THE INVENTION

The invention will now be described by reference to the preferred embodiments. This does not intend to limit the scope of the present invention, but to exemplify the invention.

Figure 1:
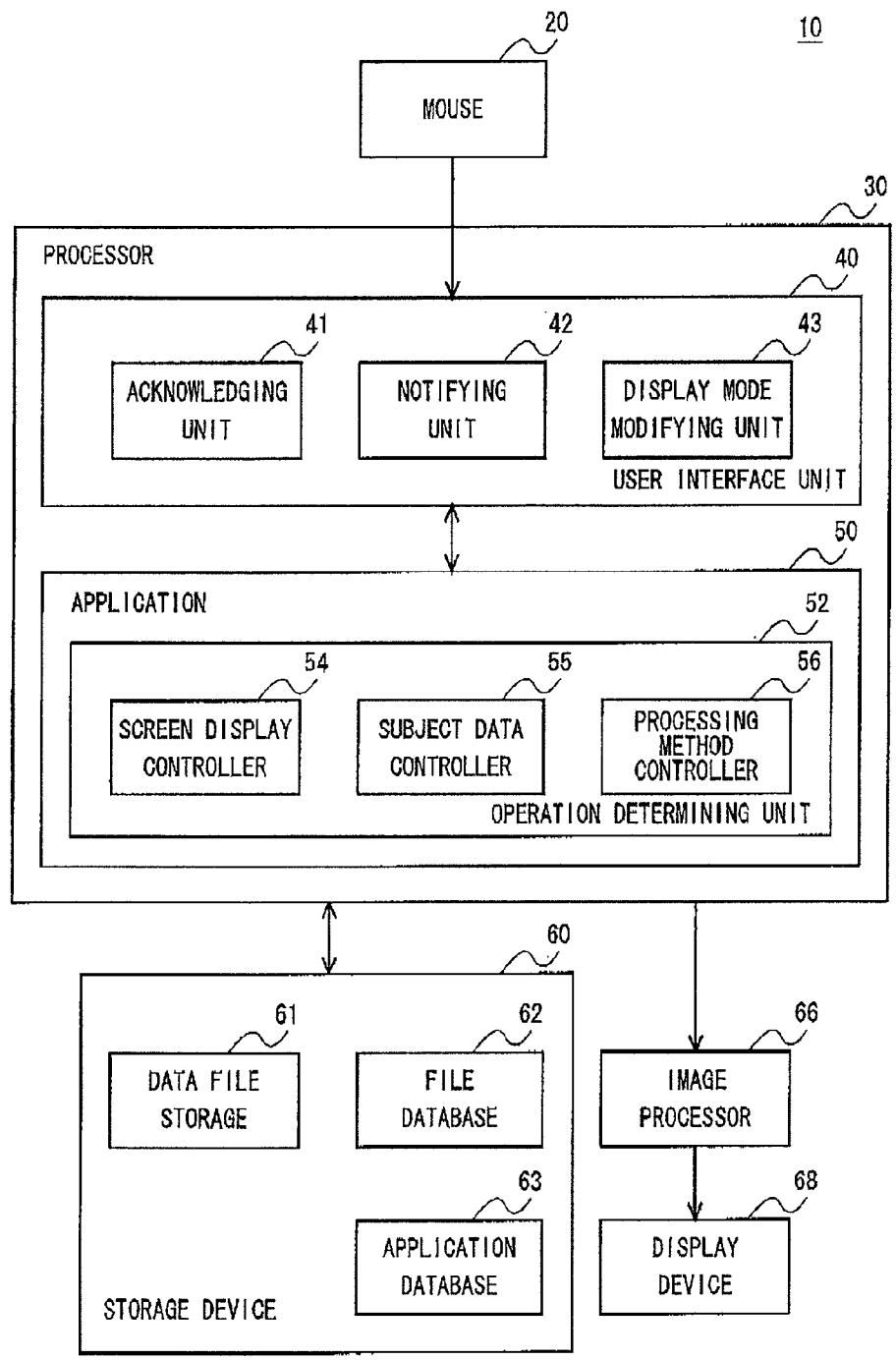
FIG. 1 shows the structure of a data processor according to an embodiment.

FIG. 1 shows the structure of a data processor according to an embodiment of the present invention. A data processor 10 is provided with a mouse 20, which is an example of a pointing device, a processor 30, a storage device 60, an image processor 66, and a display device 68. The configuration is implemented, in hardware components, by any CPU of a computer and a memory, and in software by a program or the like loaded into the memory. FIG. 1 depicts functional blocks implemented by the cooperation of hardware and software. Therefore, it will be obvious to those skilled in the art that the functional blocks may be implemented in a variety of manners by hardware only, software only, or a combination of thereof.

The processor 30 includes a user interface unit 40 which accepts a user's operation via the mouse 20, and an application 50 which is started in accordance with the operation thus accepted. The application 50 processes a data file stored in a data file storage 61. The operations requested via the mouse 20 include pointer movement, clicking of a button, drag, and drop. The image processor 66 displays a user interface screen generated by the user interface unit 40 on the display device 68, and displays an application screen generated by the application 50 on the display device 68.

The storage device 60 includes the data file storage 61, a file database 62, and an application database 63. The data file storage 61 stores various data files such as images, movies, sound, and documents. The data file storage 61 may be implemented by a storage device such as a hard disk drive (HDD), ROM, and RAM, or by a removable recording medium such as a CD, DVD, and MD. The file database 62 stores information on the data files stored in the data file storage 61. The application database 63 stores information on an application installed on a hard disk drive and executable in the data processor 10.

FIG. 2 shows an example of data in the file database 62. The file database 62 is provided with a file ID field 71, a file name field, 72, a path field 73, a file type field 74, and a file size field 75. The file ID field 71 stores an ID uniquely identifying a data file. The file name field 72 stores the name of a data file. The path field 73 stores the path of a folder in the data file storage 61 in which a data file is stored. The file type field 74 stores the type of a data file. The file size field 75 stores the data size of a data file.

FIG. 3 shows an example of data in the application database 63. The application database 63 is provided with an application ID field 76, a file type field 77, a processability field 78. The application ID field 76 stores an ID uniquely identifying an application. The file type field 77 and the processability field 78 store the type of data that an application is capable of processing and the processability thereof. For example, when an application is capable of processing a data file, "100" is stored. When an application is capable of processing a part of a data file, or when only limited functions of an application is capable of processing a data file, a value between "1" and "99" is stored, depending upon the degree in which the file can be processed. When an application is not capable of processing a data file at all, "0" is stored.

The user interface unit 40 includes an acknowledging unit 41, a notifying unit 42, and a display mode modifying unit 43. All or some of the functions of the user interface unit 40 may be implemented by an operating system (OS) or a software program resident on the OS.

The acknowledging unit 41 refers to the file database 62 and assigns a first object to a data file stored in the data file storage 61 and displays the first object on the screen. The unit 41 accepts an operation of the data file in the form of an operation of the first object. The acknowledging unit 41 also refers to the application database 63 and assigns a second object to an application processing the data file and displays the second object on the screen. The unit 41 accepts an operation of the application in the form of an operation of the second object.

When an operation to allow the first object to affect the second object is accepted, the notifying unit 42 notifies the application to which the second object is assigned of the data file to which the first object is assigned. Further, the unit 42 notifies the application of the direction or speed in which the first object is operated to affect the second object, or the position at which the first object is allowed to affect the second object. The notifying unit 42 may first notify the application of the name, extension, or file type of the data file, and then of the path of the data file once it is determined that the application is capable of processing the data file. Alternatively, the unit 42 may supply the application with information including the path of the data file immediately so as to allow the application to determine whether the data file can be processed.

The display mode modifying unit 43 modifies the mode of displaying the first object or the second object depending on whether the application assigned the second object is capable of processing the data file assigned the first object. The display mode modifying unit 43 refers to the application database 63 so as to determine whether the application assigned the second object is capable of processing the data file assigned the first object. If the file can be processed, the unit 43 displays graphics of shapes fitting each other in the neighborhood of the first object and the second object. If the data file can be processed partially, graphics of shapes partially fitting each other are displayed. If the data file cannot be processed, graphics of shapes not fitting each other are displayed.

Upon being notified by the user interface unit 40 that an operation to allow the first object to affect the second object is accepted, the application 50 processes the data file assigned the first object. The application 50 includes an operation determining unit 52 which is notified by the user interface unit 40 of the direction or speed in which the first object is operated to affect the second object, or the position at which the first object is allowed to affect the second object, and determines an operation performed in processing the data file, based on the information.

The operation determining unit 52 includes a screen display controller 54, a subject data controller 55, and a processing method controller 56. The screen display controller 54 determines the position or size of a screen displayed on the display device 68, based on the direction or speed in which the first object is operated to affect the second object, or the position at which the first object is allowed to affect the second object. The subject data controller 55 determines data to be processed from among the data included in the data file, based on the direction or speed in which the first object is operated to affect the second object, or the position at which the first object is allowed to affect the second object. The processing method controller 56 determines how the data included in the data file is processed, based on the direction or speed in which the first object is operated to affect the second object, or the position at which the first object is allowed to affect the second object.

Figure 4:
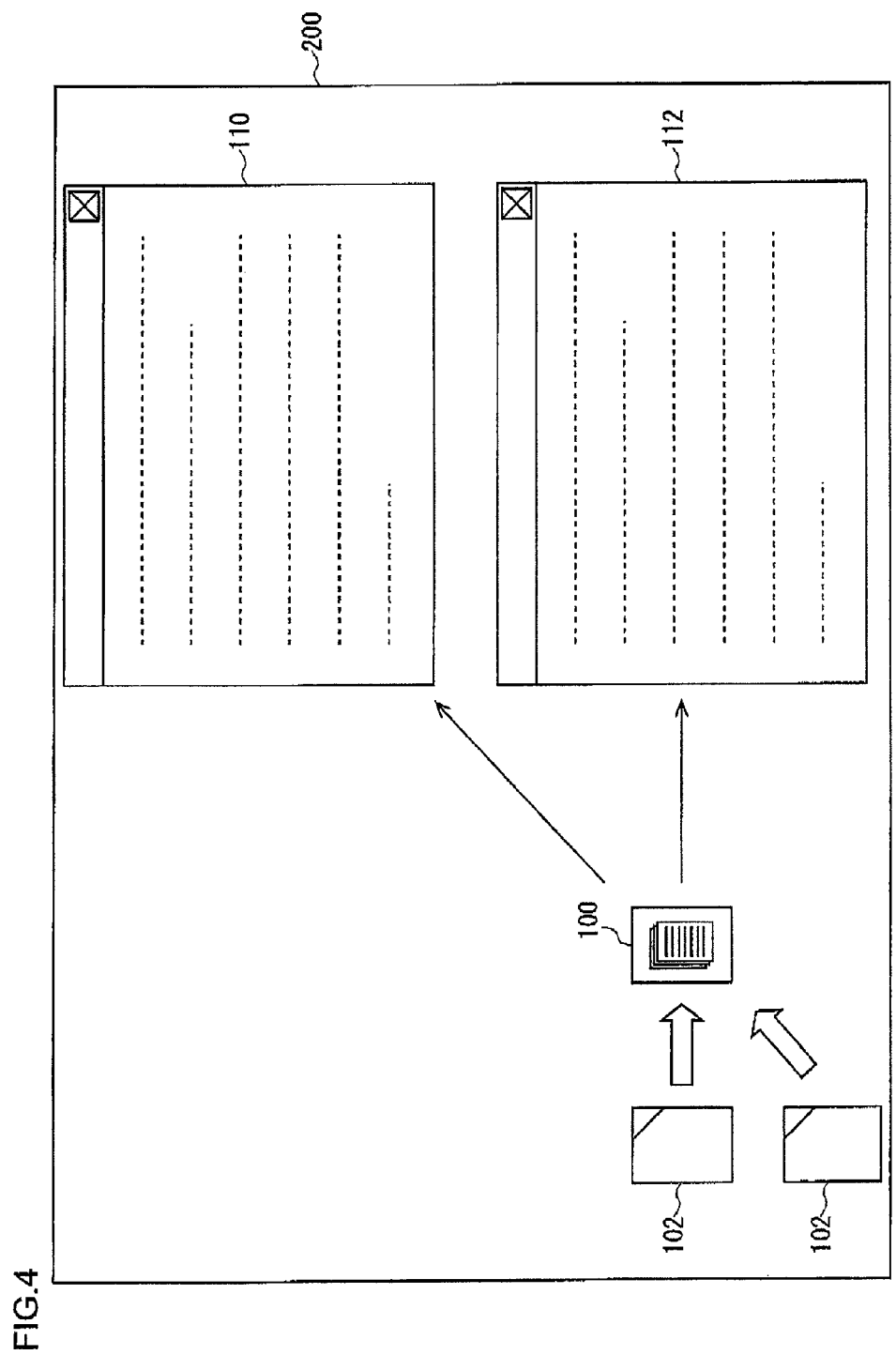
FIG. 4 shows the function of a screen display controller.

FIG. 4 shows the function of the screen display controller 54. The user interface unit 40 displays on a display screen 200 an icon 102 of a data file and an icon 100 of an application capable of processing the data files. When a user uses the mouse 20 to drag the icon 102 of the data file and drops it onto the icon 100 of the application, the acknowledging unit 41 accepts the operation. The notifying unit 42 notifies the application 50 corresponding to the icon 100 of the data file and starts the application 50. The notifying unit 42 also notifies the application 50 thus started of the direction and speed of the drag, and the position at which the icon 102 is dropped onto the icon 100.

The screen display controller 54 of the application 50 determines the position of a screen displayed by the application 50, based on the direction or speed of the drag, or the position at which the icon is dropped, which are thus communicated. In the example shown in FIG. 4, when the icon 102 is dragged from bottom left to top right and dropped onto the icon 100, the screen display controller 54 displays a window 110 of the application 50 toward the top right of the display screen 200. When the icon 102 is dragged horizontally from left to right and dropped onto the icon 100, the screen display controller 54 displays a window 112 of the application 50 to the right of the icon 100 in the display screen 200. In this way, a window may be displayed where the icon 102 would appear if the drag operation is continued. Alternatively, a window may be displayed where the icon 102 is dropped onto the icon 100, i.e., on the same side of the icon 100 where the icon 102 is allowed to come into contact with the icon 100. For example, a window may be displayed toward bottom right of the screen if the icon 102 is dropped onto the bottom right position of the icon 100. The screen display controller 54 may display a window such that the higher the speed of drag operation, the farther the window from the icon 100. Alternatively, a window may be closer to the edge of the screen as the speed of drag operation is increased. By providing these functionalities, the user can select the position where the window of an application is displayed at will. Therefore, convenience for the user is improved.

Figure 5:
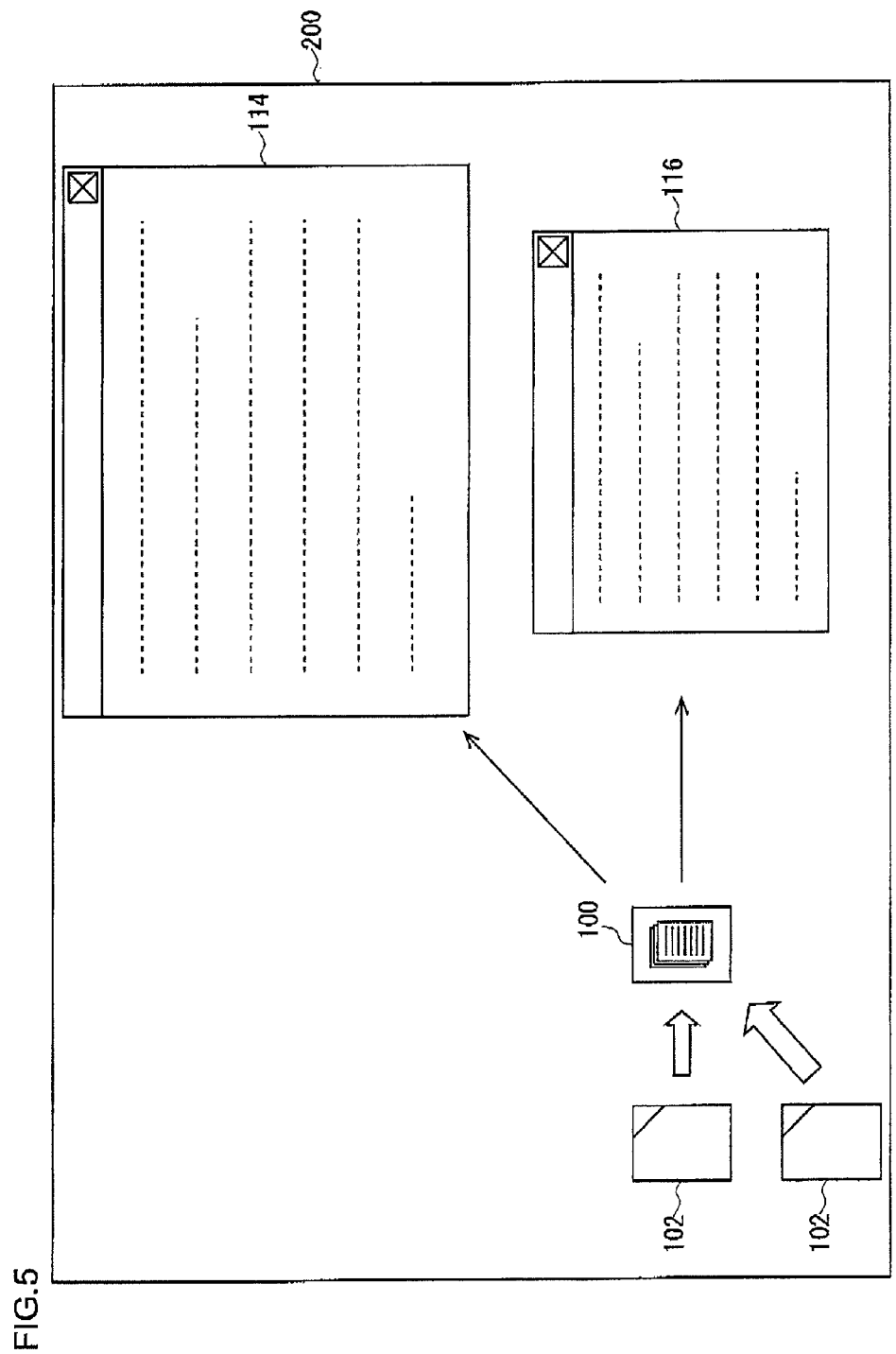
FIG. 5 shows the function of the screen display controller.

FIG. 5 shows the function of the screen display controller 54. The screen display controller 54 determines the display size of a screen, based on the speed of drag operation communicated thereto. In the example shown in FIG. 5, the screen display controller 54 displays a large window 114 of the application 50 if the icon 102 is dragged and dropped onto the icon 100 quickly. The screen display controller 54 displays a small window 116 of the application 50 if the icon 102 is dragged and dropped onto the icon 100 slowly. In this way, the higher the speed of drag operation, the larger the display size of a window may be. By providing these functionalities, the user can select the display size of the window of an application at will. Therefore, convenience for the user is improved.

Figure 6:
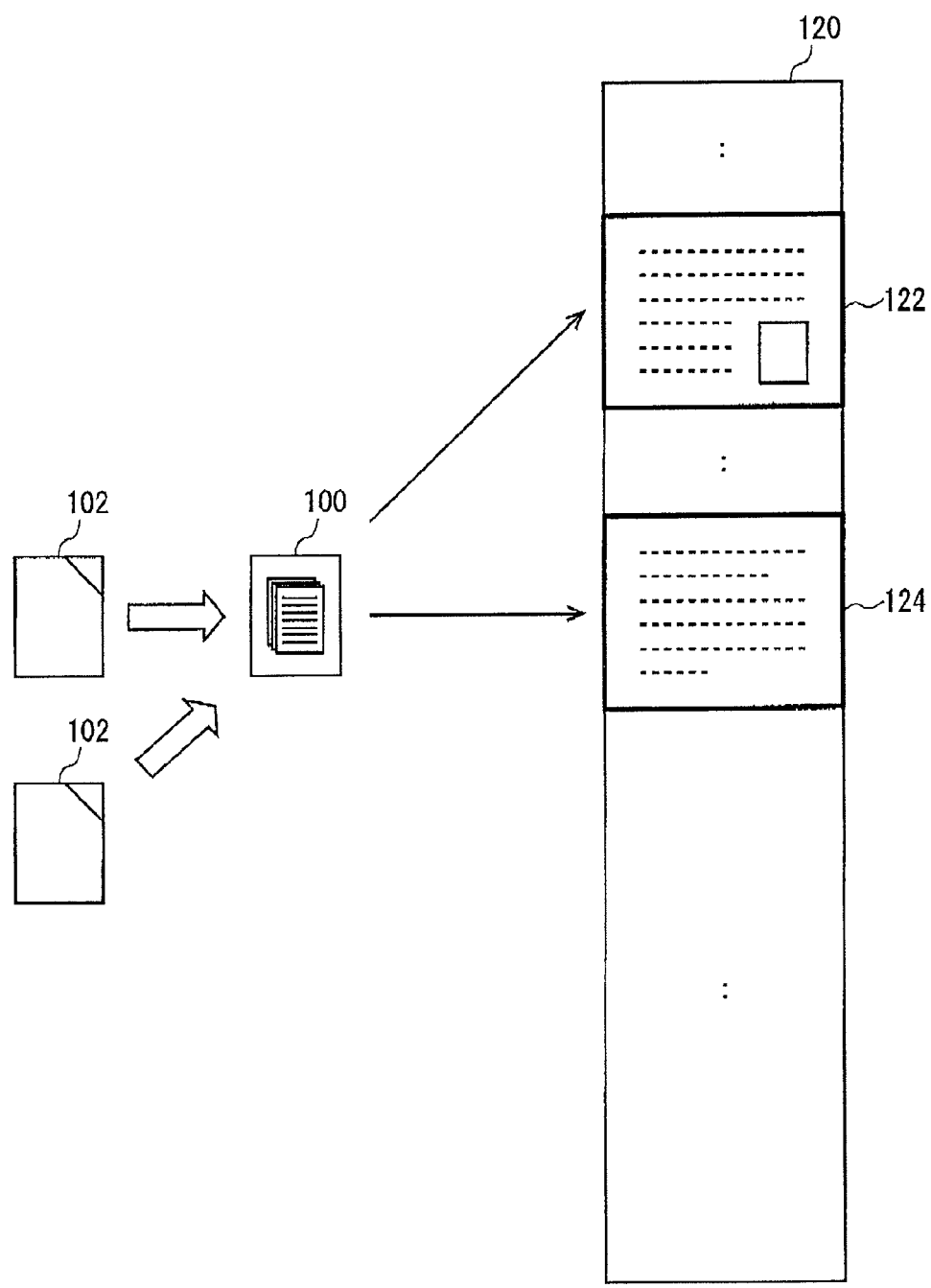
FIG. 6 shows the function of a subject data controller.

FIG. 6 shows the function of the subject data controller 55. The subject data controller 55 determines data to be processed from among the data included in the data file, based on the direction or speed of the drag operation, or the position at which the icon is dropped, which are communicated to the controller 55. In the example shown in FIG. 6, the data file 120 includes document data created by a document processing application. The subject data controller 55 determines data 122 toward the start of the data file 120 as a subject to be processed, if the icon 102 is dragged from bottom left to top right and dropped onto the icon 100. The subject data controller 55 determines data 124 in the middle of the data file 120 as a subject to be processed, if the icon 102 is dragged horizontally from left to right and dropped onto the icon 100. Thus, the data included in the data file 120 may be virtually arranged on the display screen 200 in the vertical direction, and the data located where the icon 102 would appear if the drag operation is continued may be determined as a subject to be processed. Alternatively, the data, located where the icon 102 is dropped onto the icon 100, i.e., located on the same side of the icon 100 where the icon 102 is allowed to come into contact with the icon 100, may be the subject to be processed. The subject data controller 55 may determine data as a subject to be processed such that the higher the speed of the drag operation, the farther the selected data from the icon 100. Alternatively, data toward the start or end of the data file may be determined as being a subject to be processed, as the speed of drag operation is increased. By providing these functionalities, the user can select data to be processed at will. Therefore, convenience for the user is improved.

Figure 7:
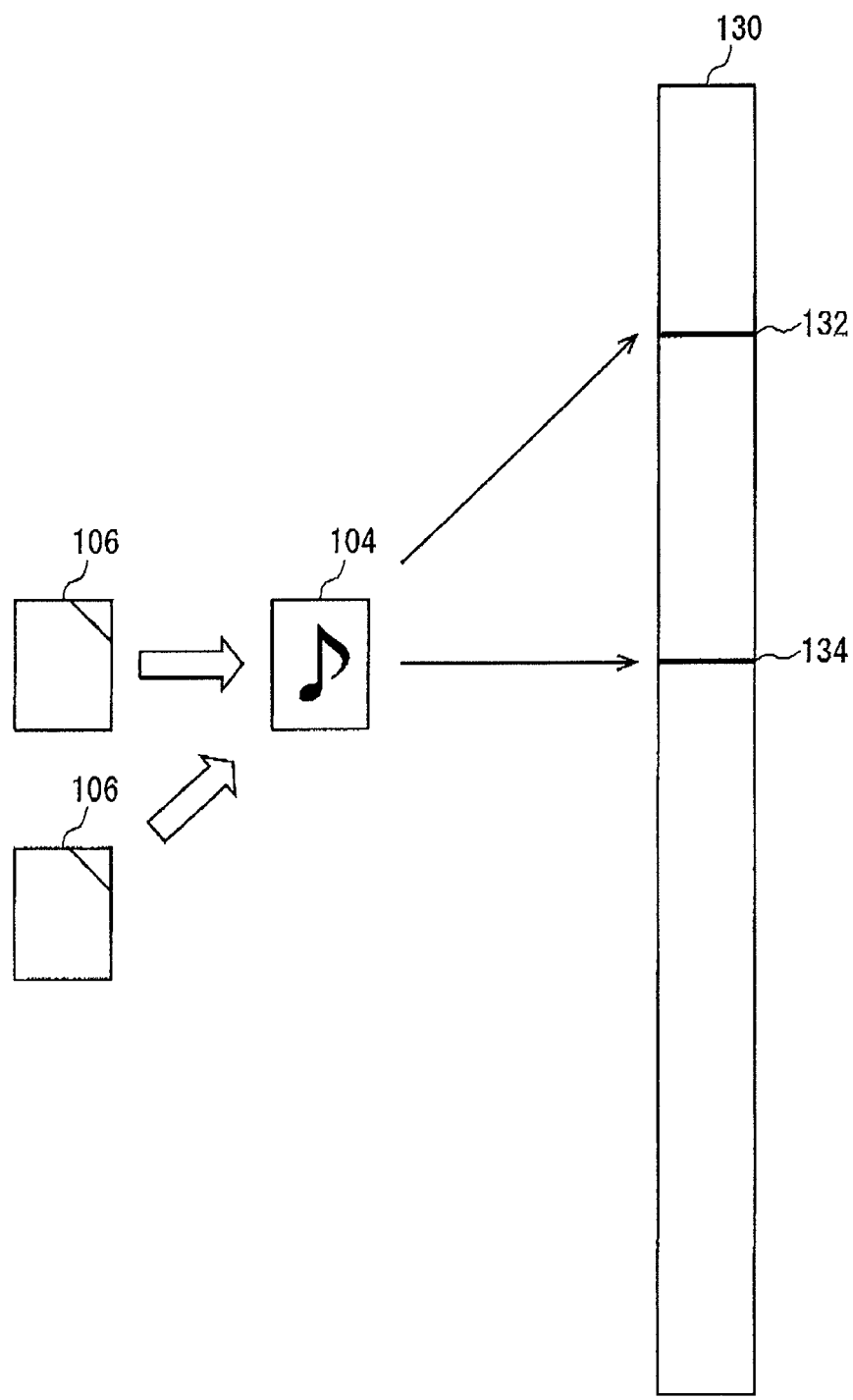
FIG. 7 shows the function of the subject data controller.

FIG. 7 shows the function of the subject data controller 55. In the example shown in FIG. 7, an icon 106 assigned to a data file 130 that contains music data, and an icon 104 assigned to an application for playing back music are displayed on the display screen 200. The subject data controller 55 determines music data 132 toward the start of the data file 130 as a subject to be processed, if the icon 106 is dragged from bottom left to top right and dropped onto the icon 104. The application for playing back music starts playing back the music at a position 132. The subject data controller 55 determines music data 134 in the middle of the data file 130 as a subject to be processed, if the icon 106 is dragged horizontally from left to right and dropped onto the icon 104. By providing these functionalities, the user can select the position where the playback of music or a movie is started at will. Therefore, convenience for the user is improved.

Figure 8:
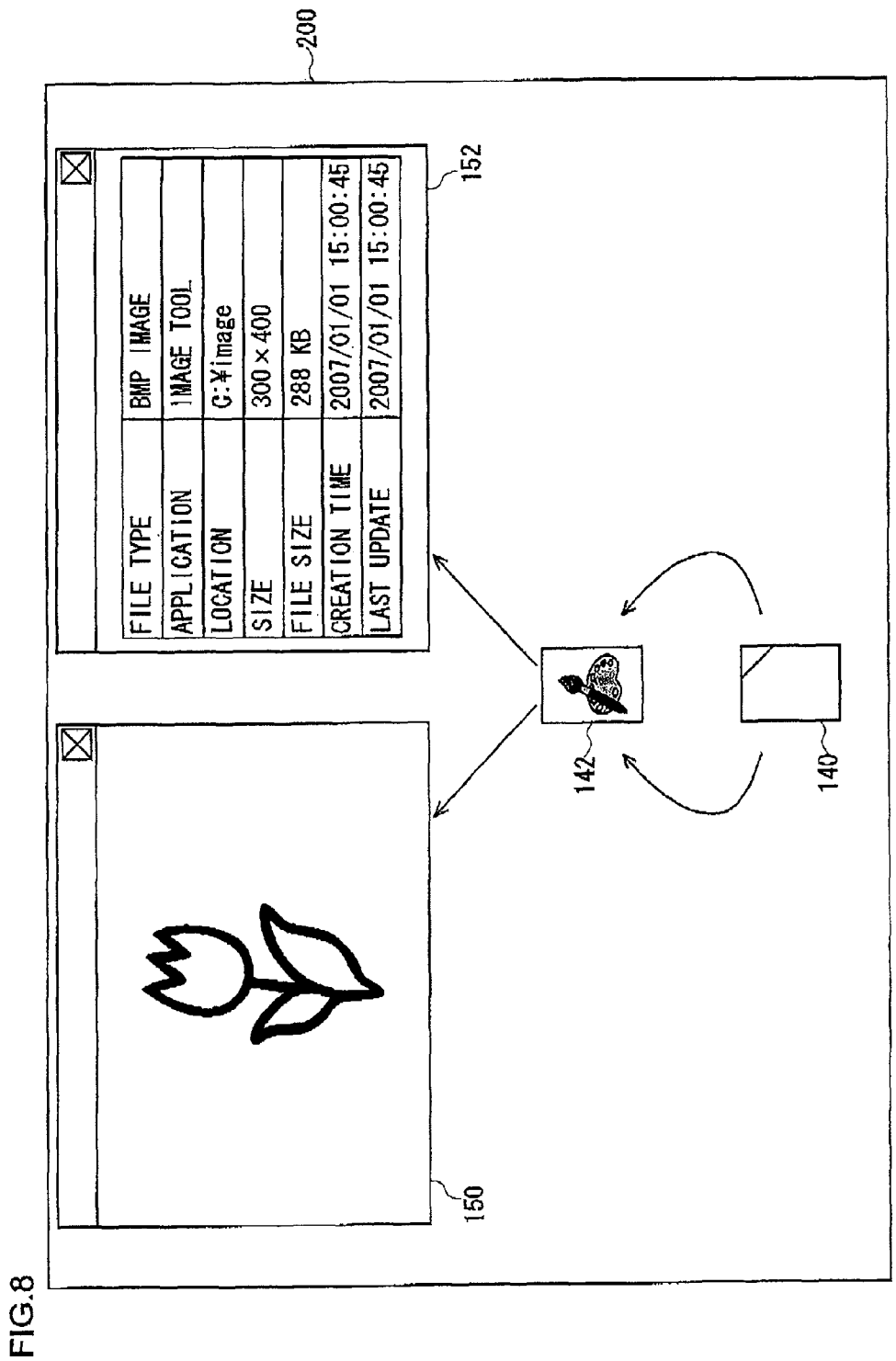
FIG. 8 shows the function of a processing method controller.

FIG. 8 shows the function of the processing method controller 56. The processing method controller 56 determines how the data included in the data file is processed, based on the direction or speed of the drag operation, or the position at which the icon is dropped, which are communicated to the controller 56. In the example shown in FIG. 8, an icon 140 assigned to a data file including image data, and an icon 142 assigned to an application processing image data are displayed on the display screen 200. The processing method controller 56 selects a processing method whereby the image data included in the data file is displayed, if the icon 140 is dragged from right to left and dropped onto the icon 142. The application processing images displays in a window 150 the image data included in the data file and accepts a user's request for editing. The processing method controller 56 selects a processing method whereby the property of the image data included in the data file is displayed, if the icon 140 is dragged from left to right and dropped onto the icon 142. The application processing images displays in a window 152 the property of the image data included in the data file. By providing these functionalities, the user intending to open a data file in an application can select a method of processing data included in the data file at will. Therefore, convenience for the user is improved.

Figure 9:
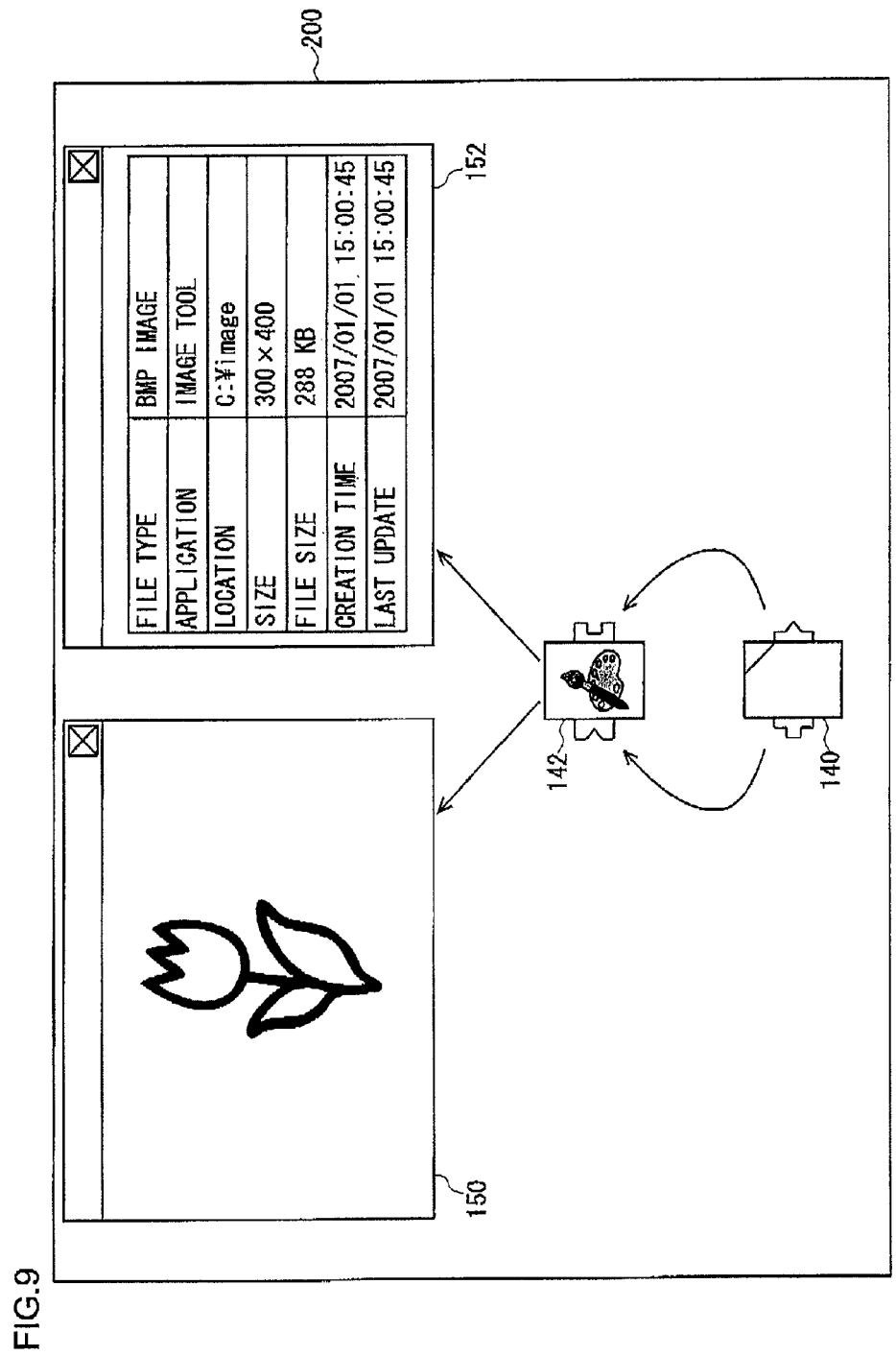
FIG. 9 shows the function of a display mode modifying unit.
Figure 10:
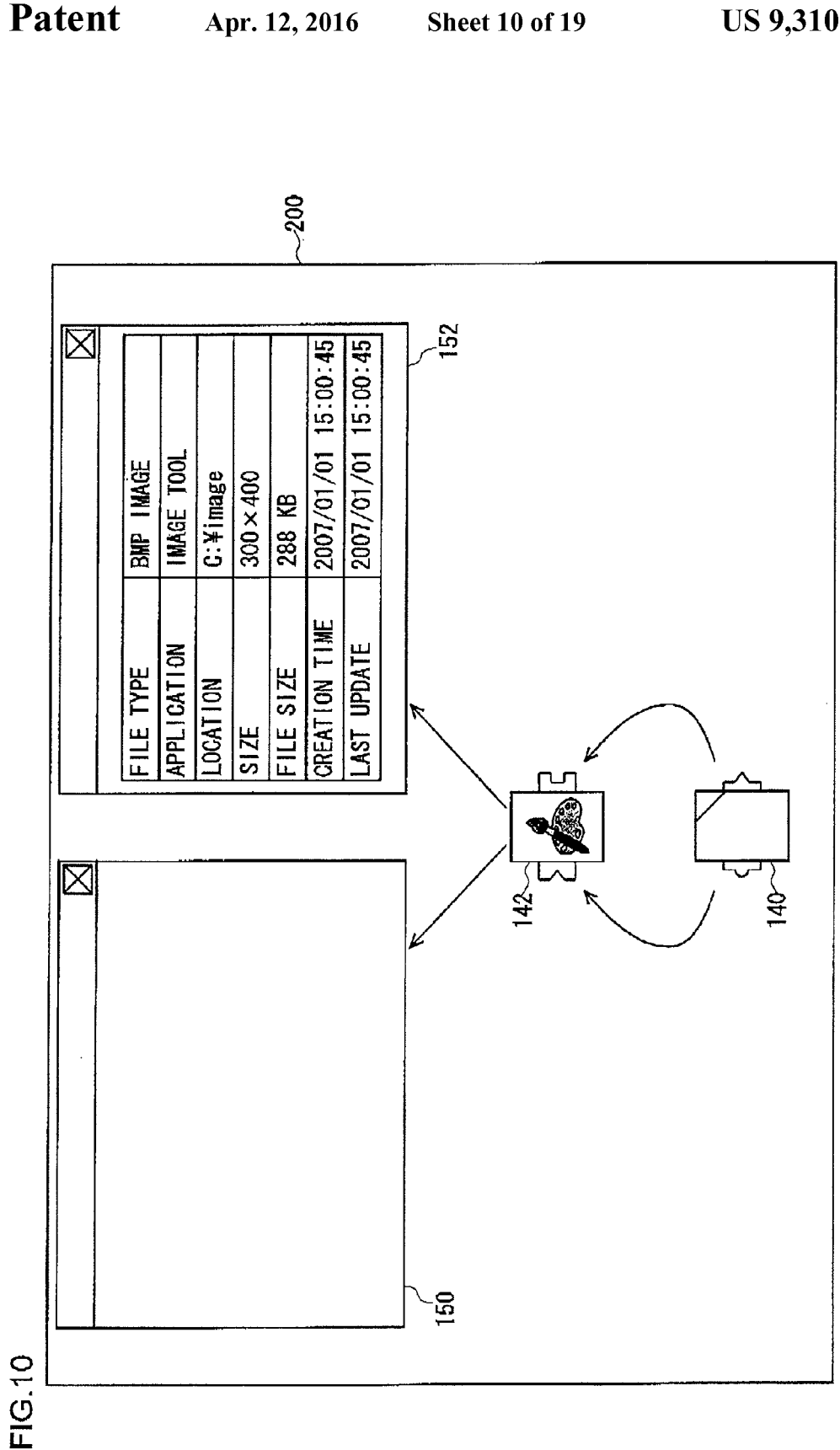
FIG. 10 shows the function of the display mode modifying unit.

FIGS. 9 and 10 show the function of the display mode modifying unit 43. The display mode modifying unit 43 changes the mode of displaying an icon assigned to an application or an icon assigned to a data file, depending on whether the application is capable of processing the data file. In the examples shown in FIGS. 9 and 10, a graphic indicating whether an application is capable of processing a data file is displayed adjacent to an icon 140 assigned to a data file including image data, and an icon 142 assigned to an application processing image data. The display mode modifying unit 43 refers to the application database 63 so as to determine whether the application corresponding to the icon 142 is capable of processing the data file corresponding to the icon 140. If the file can be processed, graphics of shapes fitting each other are displayed in the neighborhood of the icon 140 and the icon 142. If not, graphics of shapes not fitting each other are displayed in the neighborhood of the icon 140 and the icon 142.

The display mode modifying unit 43 may display a graphic indicating whether the application is capable of processing the data file when the distance between the icon 140 and the icon 142 is smaller than a predetermined value. For example, a graphic may be displayed when the icon 140 is dragged near the icon 142 and made to disappear when the icon 140 is moved away from the icon 142. In this way, information on the application and the data file in focus can be provided without largely affecting the design of the user interface screen.

If there are multiple methods by which the application is capable of processing the data file, the display mode modifying unit 43 may display a graphic indicating whether the data file can be processed by the respective processing methods. In the examples shown in FIGS. 9 and 10, a graphic is displayed to the right of the icon 142 of the application, indicating the type of data file that can be processed by the application. To the left of the icon 142 is displayed a graphic indicating the type of data file for which the application is capable of displaying the property. If the application is capable of processing a data file, a graphic having a convex part fitting the concave part of the graphic displayed to the right of the icon 142 of the application is displayed to the left of the icon 140 of the data file. If the processing is not enabled, a graphic having a convex part not fitting the concave part is displayed. If the application is capable of displaying the property of a data file, a graphic having a convex part fitting the concave part of the graphic displayed to the left of the icon 142 of the application is displayed to the right of the icon 140. If the property cannot be displayed, a graphic having a convex part not fitting the concave part is displayed. With this, the user can refer to the graphic to the right of the icon 142 of the application and the graphic to the left of the icon 140 of the data file to predict the process occurring when the icon 140 is dragged onto the icon 142 from right, i.e., whether the process of displaying the image data of the data file is enabled. The user can also refer to the graphic to the left of the icon 142 and the graphic to the right of the icon 140 to predict the process occurring when the icon 140 is dragged onto the icon 142 from left, i.e., whether the process of displaying the property of the data file is enabled. Therefore, convenience for the user is improved.

In the example shown in FIG. 9, the concave part of the graphic to the right of the icon 142 fits the convex part of the graphic to the left of the icon 140, and the concave part of the graphic to the left of the icon 142 fits the convex part of the graphic to the right of the icon 140. Therefore, it is known that the application corresponding to the icon 142 is capable of processing the image data of the data file corresponding to the icon 140 and is capable of displaying the property. In the example shown in FIG. 10, the graphic to the left of the icon 142 fits the graphic to the right of the icon 140, and the graphic to the right of the icon 142 does not fit the graphic to the left of the icon 140. Therefore, it is known that the application is capable of displaying the property of the data file but is not capable of processing the image data. By representing whether an application is capable of processing a data file depending on whether the concave part of one graphic fits the convex part of another graphic, intuitive user interface is built.

Figure 11:
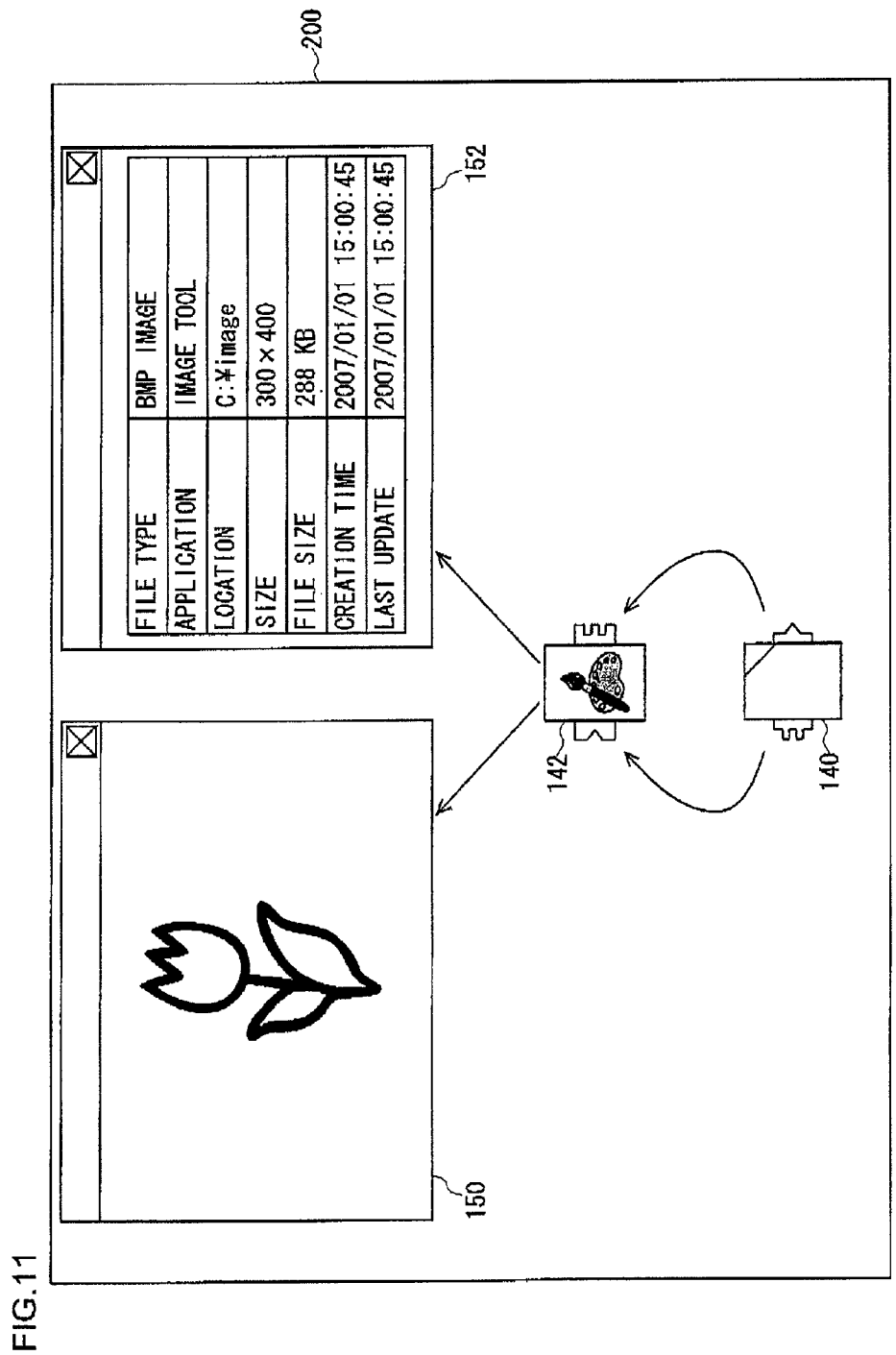
FIG. 11 shows the function of the display mode modifying unit.
Figure 12:
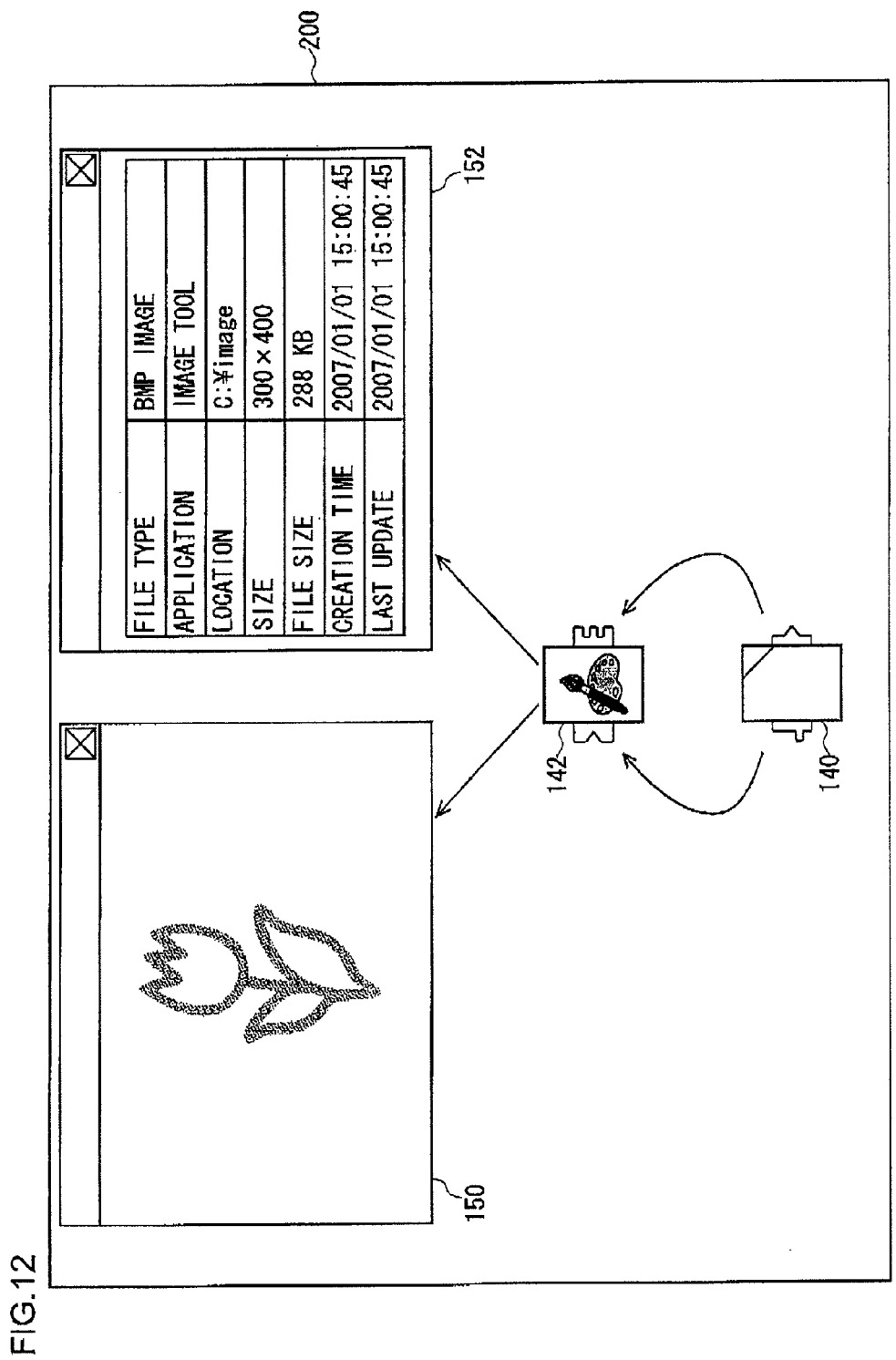
FIG. 12 shows the function of the display mode modifying unit.

FIGS. 11 and 12 show the function of the display mode modifying unit 43. If an application is capable of processing a data file partially, the display mode modifying unit 43 may display graphics of shapes partially fitting each other in the neighborhood of the icon 142 of the application and the icon 140 of the data file. In the example shown in FIG. 11, a graphic having two concave parts is displayed to the right of the icon 142 of the application, and a graphic having two convex parts and fitting the graphic to the right of the icon 142 is displayed to the left of the icon 140 of the data file. Accordingly, the process occurring when the icon 140 is dragged onto the icon 142 from right can be predicted. More specifically, it is known that the image data of the data file can be processed. In the example shown in FIG. 12, a graphic having two concave parts is displayed to the right of the icon 142 of the application, and a graphic having a convex part fitting one of the concave parts of the graphic to the right of the icon 142 is displayed to the left of the icon 140 of the data file. Accordingly, it is known that the application is capable of processing the image data of the data file partially. That an application is capable of processing a data file partially may mean that the application is capable of processing limited functions. For example, the application may be capable of displaying the image data of the data file in black and white but not in color, or that the application is capable of displaying but not editing the data.

Figure 13:
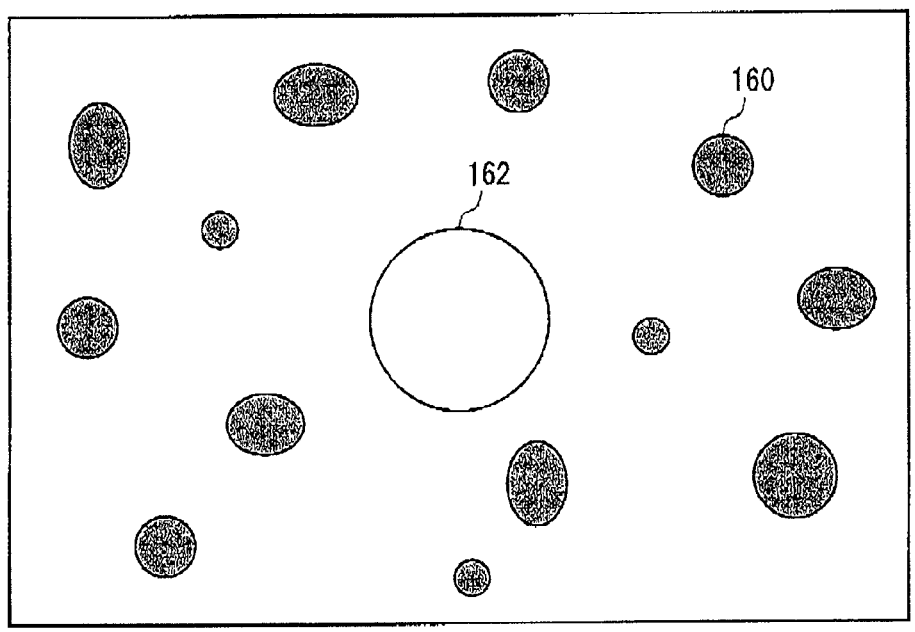
FIG. 13 shows another example of a user interface screen according to the embodiment.

FIG. 13 shows another example of a user interface screen according to the embodiment. In the example shown in FIG. 13, metaballs, instead of icons, are assigned to data files and applications. The user interface unit 40 displays on the display screen 200 a metaball 160 of a data file and a metaball 162 of an application capable of processing the data file. The user interface such as this is also capable of providing the aforementioned functions.

Figure 14:
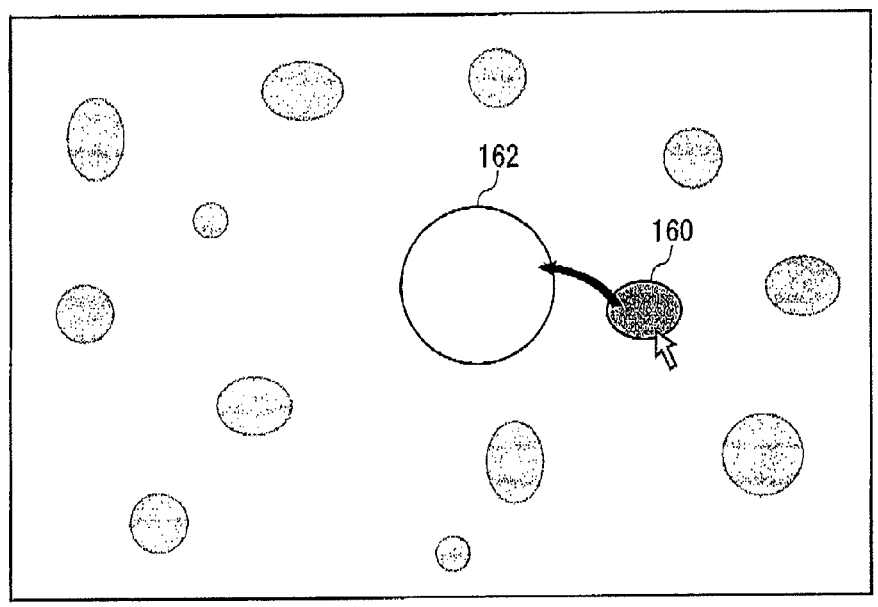
FIG. 14 shows the operation of an operation determining unit.
Figure 15:
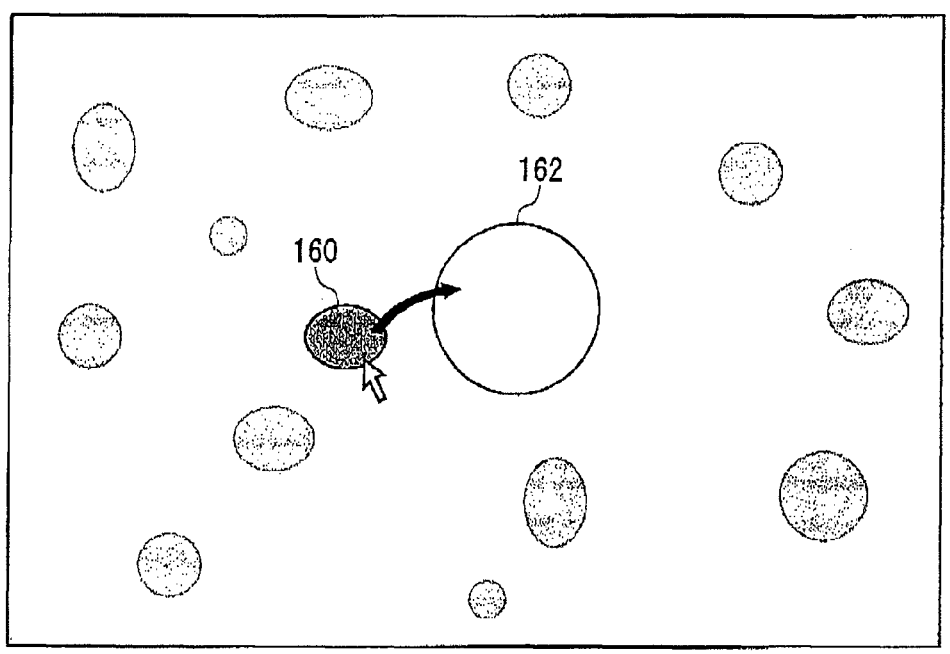
FIG. 15 shows the operation of the operation determining unit.

FIGS. 14 and 15 show the operation of the operation determining unit 52. When a user uses the mouse 20 to drag the metaball 160 of the data file and allow it to come into contact with the metaball 162 of the application, the acknowledging unit 41 accepts the operation. The notifying unit 42 notifies the application 50 corresponding to the metaball 162 of the data file and starts the application 50. The notifying unit 42 also notifies the application 50 thus started of the direction and speed of the drag, and the position at which the metaball 160 is dropped. The operation determining unit 52 of the application 50 determines the position of a screen displayed, data to be processed, processing method, or the like, based on the direction or speed of the drag, or the position at which the metaball is dropped, which are thus communicated. For example, the unit 52 may change the position of a screen displayed, data to be processed, processing method, or the like, depending on whether the metaball 160 of the data file is allowed to come into contact with the metaball 162 of the application from right, as shown in FIG. 14, or the metaball 160 of the data file is allowed to come into contact with the metaball 162 of the application from left, as shown in FIG. 15. The details of the operation of the screen display controller 54, the subject data controller 55, and the processing method controller 56 are as already described above.

Figure 16:
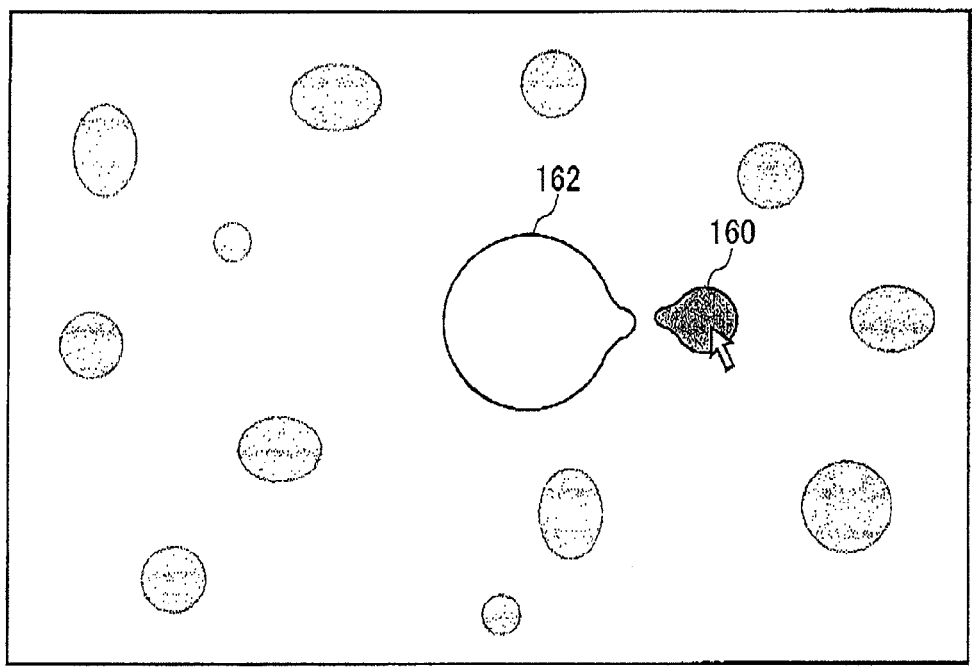
FIG. 16 shows the operation of the display mode modifying unit.
Figure 17:
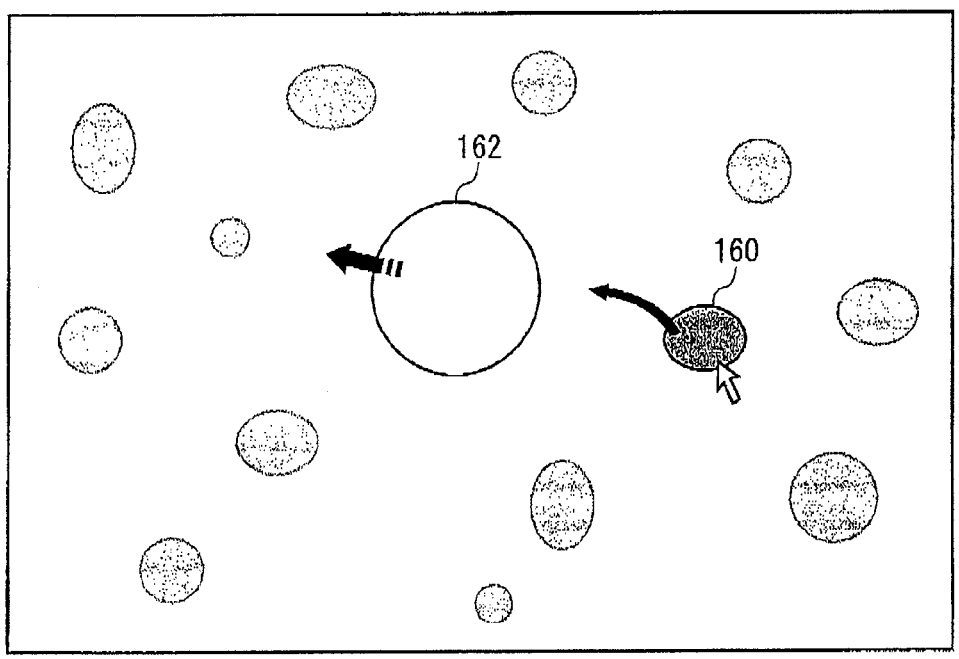
FIG. 17 shows the operation of the display mode modifying unit.
Figure 18:
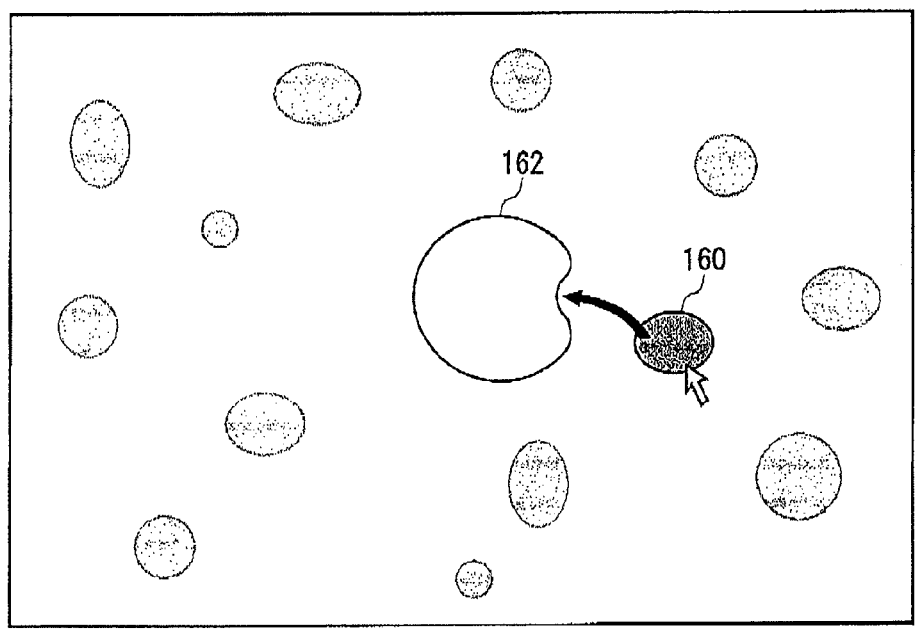
FIG. 18 shows the operation of the display mode modifying unit.

FIGS. 16, 17 and 18 show the operation of the display mode modifying unit 43. As shown in FIG. 16, if an application is capable of processing a data file, the display mode modifying unit 43 may deform or move the metaballs 160 and 162 so as to attract each other. If an application is not capable of processing a data file, the display mode modifying unit 43 may deform or move the metaballs 160 and 162 so as to repel each other. In this process, the display mode modifying unit 43 may determine the degree of deformation or movement of the metaball 160 or the metaball 162, depending on the degree in which the application is capable of processing the data file. For example, if the application is capable of processing the data file entirely, the metaballs may be deformed or moved so as to attract each other strongly, as shown in FIG. 16. If the application is capable of processing the file partially, the metaballs may be deformed or moved so as to slightly attract or repel each other, as shown in FIG. 18. If the processing is entirely disabled, the metaballs may be deformed or moved so as to repel each other strongly, as shown in FIG. 17. This allows easy-to-understand visual presentation of whether an application is capable of processing a data file so that convenience for the user is improved.

Figure 19:
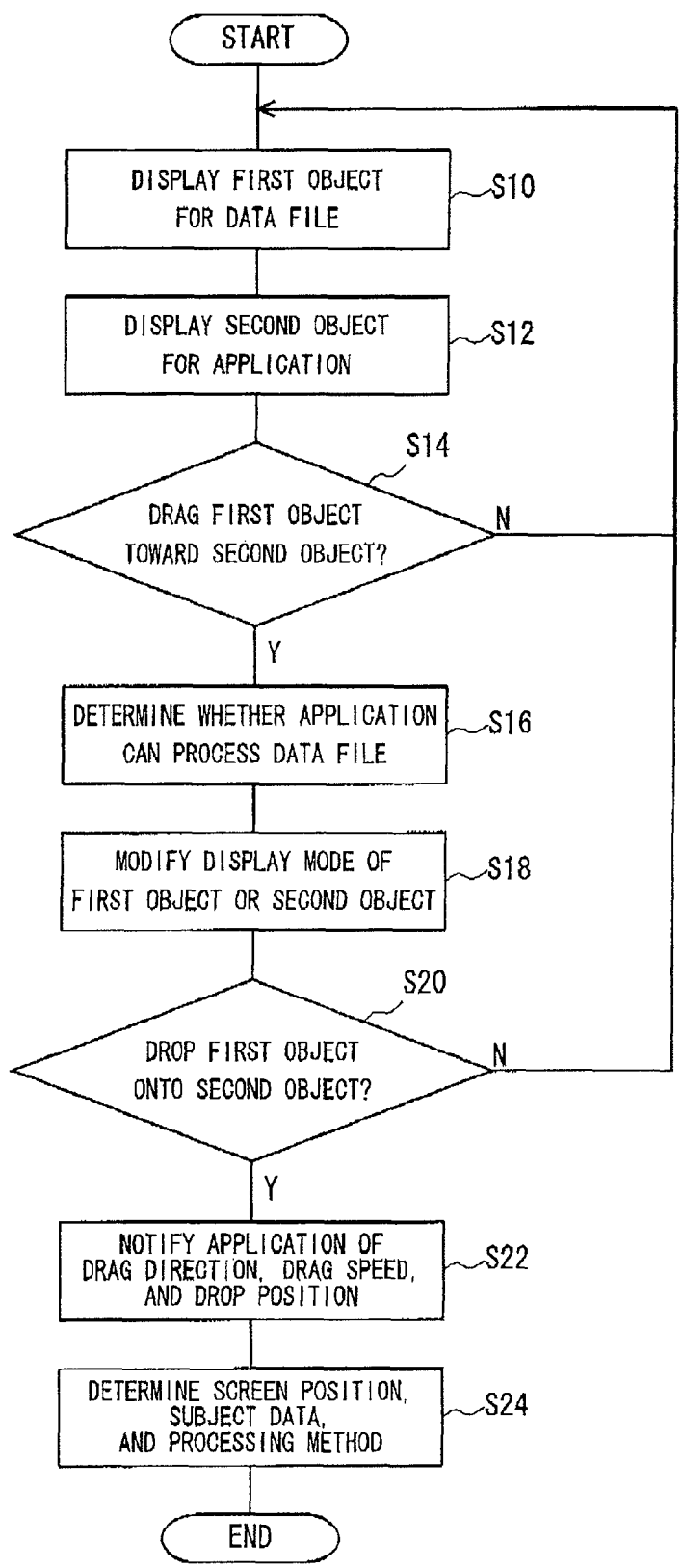
FIG. 19 is a flowchart showing the procedure of a data processing method according to the embodiment.

FIG. 19 is a flowchart showing the procedure of a data processing method according to the embodiment. The user interface unit 40 assigns a first object to a data file registered in the file database 62 and displays the object on a screen (S10). The unit 40 also assigns a second object to an application registered in the application database 63 and displays the object on the screen (S12). When the acknowledging unit 41 acknowledges that the user uses the mouse 20 to drag the first object toward the second object (Y in S14), the display mode modifying unit 43 refers to the application database 63 so as to determine whether the application corresponding to the second object is capable of processing the data file corresponding to the first object (S16). The unit 43 modifies the display mode of the first object or the second object, depending on whether the processing is enabled (S18).

When the acknowledging unit 41 acknowledges that the user uses the mouse 20 to drop the first object onto the second object (Y in S20), the notifying unit 42 notifies the application 50 corresponding to the second object of the direction and speed of the drag, and the position at which the object is dropped (S22). The operation determining unit 52 of the application 50 determines the position of a screen displayed, data to be processed, processing method, or the like, based on the direction or speed of the drag, or the position at which the object is dropped, which are thus communicated (S24).

Given above is an explanation based on the embodiment. The embodiment is intended to be illustrative only and it will be obvious to those skilled in the art that various modifications to constituting elements and processes could be developed and that such modifications are also within the scope of the present invention.

What is claimed is:

1. A data processing program executable by a computer that is recorded on a non-transitory computer readable medium comprising:

a module adapted to receive notification from a user interface which assigns a first object to a data file, displays the first object on a screen, and accepts an operation of the data file in the form of an operation of the first object, and which assigns a second object to an application adapted to process the data file, displays the second object on the screen, and accepts an operation of the application in the form of an operation of the second object, the module being notified by the user interface that a drag operation in which the first object is moved and overlapped with the second object is accepted and processing the data file assigned the first object; and a module which is notified by the user interface of the direction of the drag operation so as to determine an operation performed in processing the data file, based on the direction, wherein the module which determines an operation displays a window of the application at a position located in the same direction as the direction of the drag operation or in the opposite direction of the drag operation when the first object overlaps the second object, and, if the drag operation is in a first direction, a first operation is performed in processing the data file based on the first direction, and, if the drag operation is in a second direction different than the first direction, a second operation different than the first operation is performed in processing the data file based on the second direction.

2. The data processing program according to claim 1, wherein the module which determines an operation determines how the data included in the data file is processed, based on the direction of the drag operation.

3. A data processor in a computer for executing a program that is recorded on a non-transitory computer readable medium comprising:

an application adapted to receive notification from a user interface which assigns a first object to a data file, displays the first object on a screen, and accepts an operation of the data file in the form of an operation of the first object, and which assigns a second object to an application adapted to process the data file, displays the second object on the screen, and accepts an operation of the application in the form of an operation of the second object, the application being notified by the user interface that a drag operation in which first object is moved and overlapped with the second object is accepted and processing the data file assigned the first object, wherein the application includes an operation determining unit which is notified by the user interface of the direction of the drag operation so as to determine an operation performed in processing the data file, based on the direction or speed, and the operation determining unit displays a window of the application at a position located in the same direction of the drag operation or in the opposite direction of the drag operation when the first object overlaps the second object, and, if the drag operation is in a first direction, a first operation is performed in processing the data file based on the first direction, and, if the drag operation is in a second direction different than the first direction, a second operation different than the first operation is performed in processing the data file based on the second direction.

4. The data processing program according to claim 1, wherein the module which determines an operation receives notification of a speed of the drag operation and displays the window such that the higher the speed, the farther the window from the first object.

5. The data processing program according to claim 1, wherein the module which determines an operation receives notification of a speed of the drag operation and displays the window such that the higher the speed, the larger a size of the window.

* * * * *